United States Patent [19]

Kuriyama

[11] Patent Number: 5,693,104
[45] Date of Patent: Dec. 2, 1997

[54] PROCESS FOR MAKING CAPACITOR ELEMENT FOR SOLID ELECTROLYTIC CAPACITOR

[75] Inventor: Chojiro Kuriyama, Kyoto, Japan

[73] Assignee: Rohm Co. Ltd., Kyoto, Japan

[21] Appl. No.: 518,362

[22] Filed: Aug. 23, 1995

[30] Foreign Application Priority Data

Aug. 25, 1994 [JP] Japan .................................. 6-200354

[51] Int. Cl.$^6$ .................................................. H01G 9/15
[52] U.S. Cl. .................................................. 29/25.03
[58] Field of Search .................................................. 29/25.03

[56] References Cited

U.S. PATENT DOCUMENTS

| | | | |
|---|---|---|---|
| 3,621,342 | 11/1971 | Yoshimura | 29/25.03 |
| 3,624,458 | 11/1971 | Howell et al. | 29/25.03 |
| 4,067,786 | 1/1978 | Hilbert et al. | 29/25.03 |
| 4,173,062 | 11/1979 | Locke | 29/25.03 |
| 4,943,892 | 7/1990 | Tsuchiya et al. | 29/25.03 |
| 5,483,415 | 1/1996 | Nakamura et al. | 29/25.03 |

*Primary Examiner*—John Niebling
*Assistant Examiner*—Thomas G. Bilodeau
*Attorney, Agent, or Firm*—Michael D. Bednarek; Kilpatrick Stockton LLP

[57] ABSTRACT

A process of making a capacitor element for a solid electrolytic capacitor is provided which comprises the steps of preparing at least one capacitor piece which includes a chip of a sintered mass of metal powder and an anode wire projecting from the chip, forming a dielectric layer on the chip, forming a solid electrolyte layer on the chip, forming a metal layer on the chip, and cutting the metal wire at a position spaced from the chip. A water-repellent member is fitted on the anode wire and located close to the chip at least up to finishing the step of forming the solid electrolyte layer. Further, the water-repellent member is shifted along the anode wire away from the chip at least before cutting the anode wire, whereas the anode wire is cut at a position between the chip and the shifted water-repellent member.

7 Claims, 7 Drawing Sheets

PROCESS FOR MAKING CAPACITOR ELEMENT FOR SOLID ELECTROLYTIC CAPACITOR

BACKGROUND OF THE INVENTION

1. Field of the Invention

This invention relates to an improved process of making a capacitor element for a solid electrolytic capacitor such as tantalum capacitor or aluminum capacitor.

2. Description of the Related Art

Solid electrolytic capacitors such as tantalum capacitor or aluminum capacitor are known to provide a large capacitance while realizing a great size reduction. For this reason, solid electrolytic capacitors are used in various applications.

Typically, a solid electrolytic capacitor incorporates a capacitor element which is manufactured by using such a capacitor piece as shown in FIG. 10 of the accompanying drawings. Specifically, the capacitor piece designated by reference numeral 1 comprises a capacitor chip 2 and an anode wire 3 partially inserted into and partially projecting from the chip 2. The capacitor chip 2 may be a compacted and sintered mass of tantalum powder for example, in which case the anode wire 3 is also made of tantalum.

For treating the capacitor piece 1 to provide a capacitor element, the capacitor chip 2 is first immersed entirely in an aqueous solution A of phosphoric acid, and a direct current is passed for performing anodic oxidation, as shown in FIG. 11. As a result, a dielectric layer 4 of tantalum pentoxide for example is formed on the chip 2 (more specifically on the surfaces of chip forming tantalum particles) as well as on an immersed lower part of the anode wire 3.

Then, as shown in FIG. 12, the chip 2 is immersed in an aqueous solution B of manganese nitrate to the extent that the upper surface 2a of the chip 2 does not go under the surface of the manganese nitrate solution B. Subsequently, the chip 2 is lifted out of the manganese nitrate solution B for baking. Such a process step (lowering and raising) is repetitively performed until a solid electrolyte layer 4 of manganese dioxide layer is appropriately formed on the chip 2 over the dielectric layer 4.

After forming the solid electrolyte layer 5, the capacitor chip 2 is graphitized and dipped in a metal paste (not shown) of silver or nickel for forming a metal layer (not shown) which acts as a cathode electrode layer.

According the the process described above, the step of forming the solid electrolyte layer (see in FIG. 12) has been found to have a problem that a part of the manganese nitrate solution B tends to move upward, by surface tension, along the previously formed dielectric layer 4 into direct contact with the anode wire 3 and form a tail of manganese dioxide layer (solid electrolyte layer). Once this occurs, electrical insulation between the anode wire and the solid electrolyte layer 5 (cathode layer), consequently making the capacitor element non-functional or at least ill-functional.

To eliminate the above problem, it has been proposed to fit a water-repellent ring C onto the anode wire 3 close thereto throughout the manufacturing process, as shown in FIG. 13. In the step of forming the solid electrolyte layer 5 (FIG. 12), the water-repellent ring C can prevent the manganese nitrate solution B from moving upward beyond the ring C.

Cutting the anode wire 3 slightly above the water-repellent ring C provides a capacitor element 1' which may be used to constitute a packaged solid electrolytic capacitor 10, as shown in FIG. 14. Specifically, the anode wire 3 is connected to an anode lead 6, whereas the chip 2 (more strictly the cathode electrode layer formed thereon) is connected to a cathode lead 7. The capacitor element 1' together with part of the anode and cathode leads 6, 7 is enclosed in a resin package 8.

However, the prior art shown in FIGS. 13 and 14 is still disadvantageous in the following points.

First, when the chip 2 is dipped in a metal paste for forming the metal layer (cathode electrode layer), the fluid metal paste tends to move upward onto and beyond the ring C due to surface tension because the ring C is located close to the chip 2. Thus, the metal layer may come into shorting contact with the anode wire 3, consequently making the capacitor element 1' non-function or ill-functional.

Secondly, though upward advance of the metal paste can be avoided to a certain degree by making the outer diameter of the ring C much smaller than a cross-sectional dimension of the chip 2. However, since the outer diameter of the ring C cannot be reduced below 0.6 mm due to various factors (the presence of the anode wire 3 for example), there is a corresponding limitation in reducing the size of the chip 2 itself.

In the third place, due to the presence of the water-repellent ring C within the resin package 8 (see FIG. 14), the spacing T between the capacitor chip 2 and the inner end of the anode lead 6 need be correspondingly increased. As a result, the overall length L of the capacitor 10 need be correspondingly increased.

SUMMARY OF THE INVENTION

It is, therefore, an object of the present invention to provide a process of making a capacitor element for a solid electrolytic capacitor which overcomes the above-described problems.

According to the present invention, there is provided a process of making a capacitor element for a solid electrolytic capacitor comprising the steps of:

preparing at least one capacitor piece which includes a chip of a sintered mass of metal powder and an anode wire projecting from the chip;

forming a dielectric layer on the chip;

forming a solid electrolyte layer on the chip;

forming a metal layer on the chip; and cutting the metal wire at a position spaced from the chip;

wherein a water-repellent member is fitted on the anode wire and located close to the chip at least up to finishing the step of forming the solid electrolyte layer;

wherein the water-repellent member is shifted along the anode wire away from the chip at least before cutting the anode wire; and wherein the anode wire is cut at a position between the chip and the shifted water-repellent member.

In one embodiment, the water-repellent member is shifted along the anode wire away from the chip after forming the solid electrolyte layer but before forming the metal layer. In such an embodiment, the water-repellent member can be kept away from the surface of a metal past when the chip is dipped in the metal paste for forming the metal layer, thereby preventing the metal paste from moving to the anode wire by surface tension.

In another embodiment, the water-repellent member is shifted along the anode wire away from the chip after forming the metal layer but before cutting the anode wire. In such an embodiment, a portion of the metal layer extending to the water-repellent member can be removed by shifting the water-repellent member along the anode wire.

As described above, in either embodiment, the metal layer (cathode electrode layer) formed on the chip does not come into shorting contact with the anode wire. Further, the water-repellent member, which is located close to the chip at least up to finishing the step of forming the solid electrolyte layer, also performs its intended function of preventing the solid electrolyte layer from extending past the dielectric layer into shorting contact with the anode wire. Thus, it is possible to prevent production of a non-functional or poor-functional capacitor element, thereby improving the production yield.

On the other hand, after forming the metal layer, the anode wire is cut at a position between the chip and the water-repellent member. Thus, the water-repellent member does not remain on the anode wire, as opposed to the prior art wherein such a member still remains on the anode wire even after cutting thereof. As a result, when the capacitor element is incorporated in a packaged solid electrolytic capacitor, the absence of the water-repellent member within the package makes it possible either to reduce the overall size of the packaged capacitor for a given capacitance or to increase the capacitance of the capacitor for a given size of the packaged capacitor.

Preferably, the water-repellent member may be a ring which has an outer diameter which is larger than a cross-sectional dimension of the chip. In this case, the ring can be shifted along the anode wire away from the chip by a shifting member having a slot which allows passage of the chip but prevents passage of the ring.

The anode wire may be attached to a carrier bar up to finishing the step of forming the metal layer. Further, the carrier bar may be made to suspendingly support a plurality of capacitor pieces for collective treatment.

Other objects, features and advantages of the present invention will be fully understood from the following detailed description given with reference to the accompanying drawings.

DETAILED DESCRIPTION OF THE PREFERRED EMBODIMENTS

FIGS. 1 through 8 of the accompanying drawings illustrates the successive steps of making capacitor elements according to the present invention. Each of the capacitor elements may be used for a packaged tantalum capacitor or a packaged aluminum capacitor for example.

Figure 1:
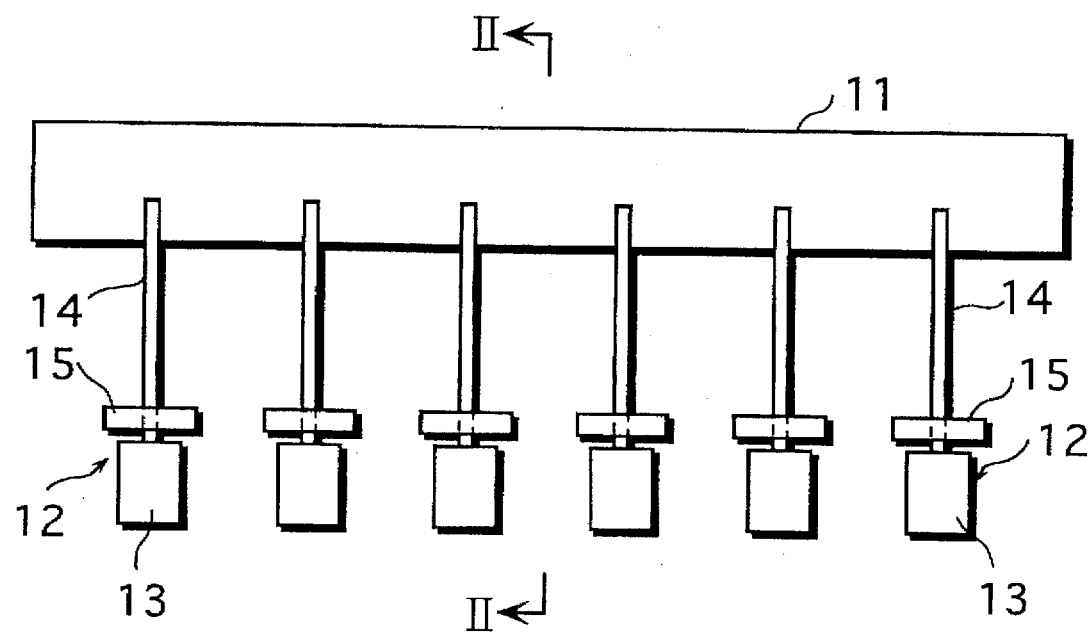
FIG. 1 is a front view showing non-treated capacitor pieces attached to a carrier bar according to an embodiment of the present invention.
Figure 2:
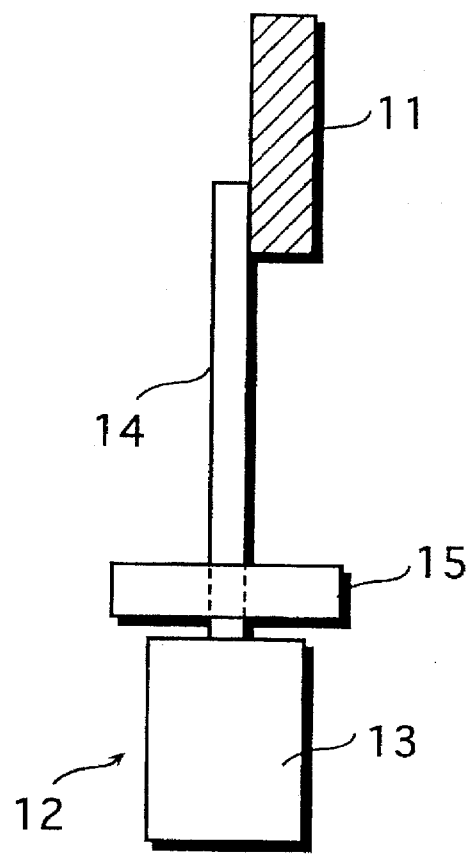
FIG. 2 is a section taken along lines II—II in FIG. 1.

First, as shown in FIGS. 1 and 2, an assembly of a metal carrier bar 11 and a plurality of non-treated capacitor pieces 12 is prepared. The capacitor pieces 12 are suspended from the carrier bar 11 as suitably spaced therealong.

Each of the capacitor pieces 12 includes a capacitor chip 13 and an anode wire 14 projecting from the chip 13. The capacitor chip 13 may be a compacted and sintered mass of tantalum powder for example, in which case the anode wire 14 is also made of tantalum. The anode wire 14 has an upper end welded to the carrier bar 11 which may be made of tantalum or stainless steel for example.

Before welding the anode wire 14 of each capacitor piece 12 to the carrier bar 11, a water-repellent resin ring 15 is fitted onto the anode wire 14 at a root portion thereof close to the capacitor chip 13. The ring 15 has a thickness of about 0.2 mm. Preferably, the ring 15 has an outer diameter which is larger than a maximum cross-sectional dimension of the capacitor chip 13.

Figure 3:
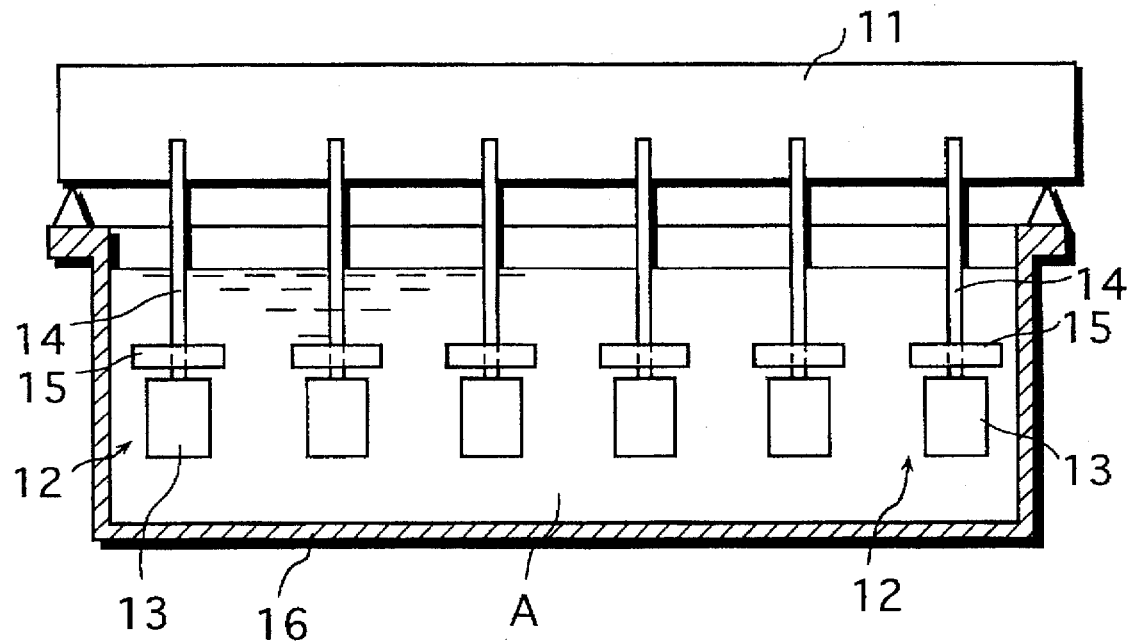
FIG. 3 is a front view, partially in vertical section, showing a step of forming a dielectric layer for the capacitor pieces.

Next, as shown in FIG. 3, the carrier bar 11 together with the capacitor pieces 12 is supported on the upper brim of a first treatment tub 16 containing a chemical solution A which may be typically an aqueous solution of phosphoric acid. In this state, the chip 13 of each capacitor piece 12 is entirely immersed in the chemical solution A, and a direct voltage is applied across the carrier bar 11 and the tub 16 for performing anodic oxidation. As a result, a dielectric layer (not shown) of tantalum pentoxide for example is formed on the chip 13 (more specifically on the surfaces of chip forming tantalum particles) as well as on an immersed lower part of the anode wire 14.

Figure 4:
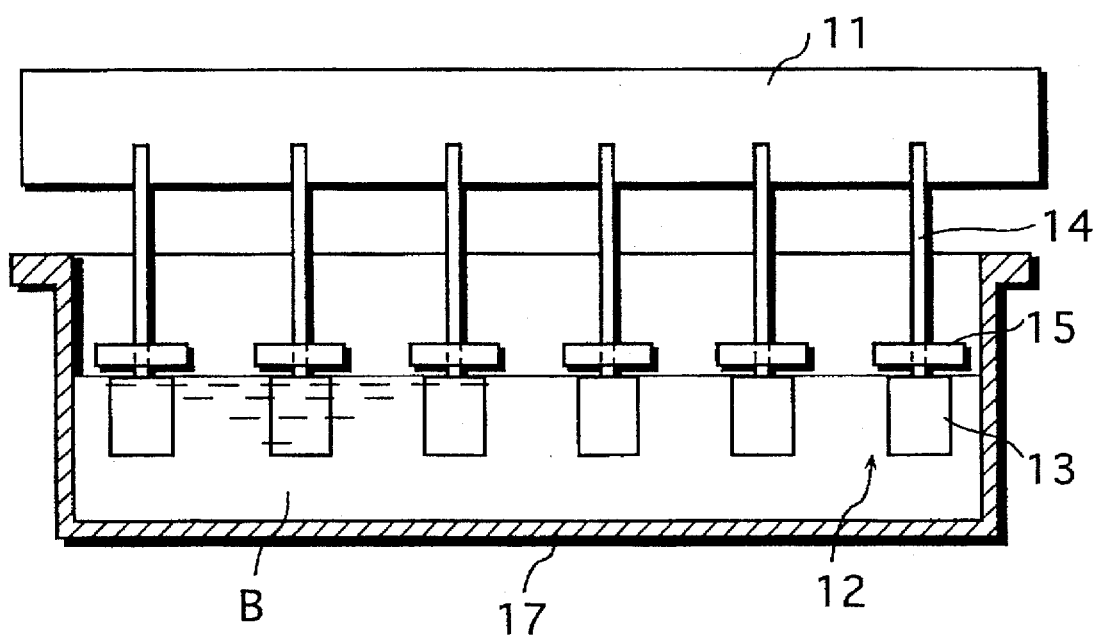
FIG. 4 is a front view, partly in vertical section, showing a step of forming a solid electrolyte layer for the capacitor pieces.

Then, as shown in FIG. 4, the carrier bar 11 is brought above a second treatment tub 17 containing an electrolyte forming solution B which may be typically an aqueous solution of manganese nitrate. In this condition, the carrier bar 11 is lowered to immerse the chip 13 of each capacitor piece 12 into the solution B for impregnation, followed by raising the carrier bar 11 to take out the chip 13 out of the solution B for baking. Such a process step (lowering and raising) is repetitively performed until a solid electrolyte layer (e.g., manganese dioxide layer) is appropriately formed on the chip 13. In this process step, the water-repellent ring 15 prevents the electrolyte forming solution B from moving upward beyond the ring 15. Normally, the lowering of the carrier bar 11 should be performed in a manner such that the upper surface of the chip 13 does not go under the surface of the solution B. However, due to the presence of the water-repellent ring 15, excessive immersion of the chip 13 is not problematic as long as the ring 15 is located above the surface of the solution B.

Figure 5:
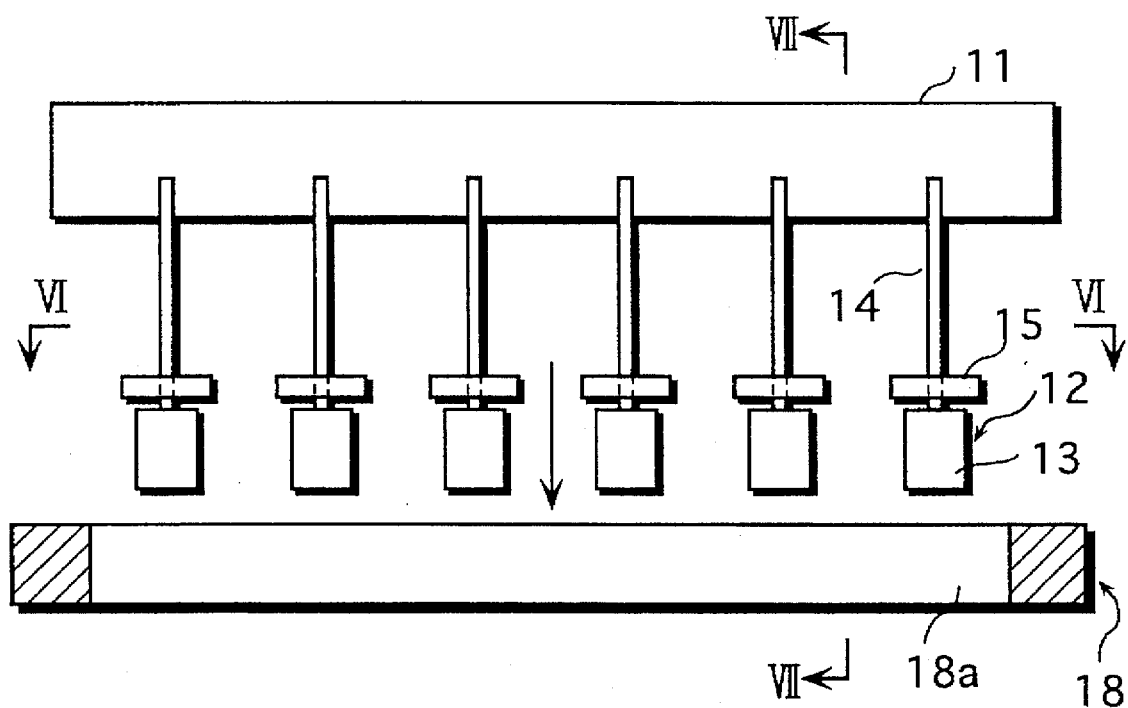
FIG. 5 is a front view showing a ring shifting step.
Figure 6:
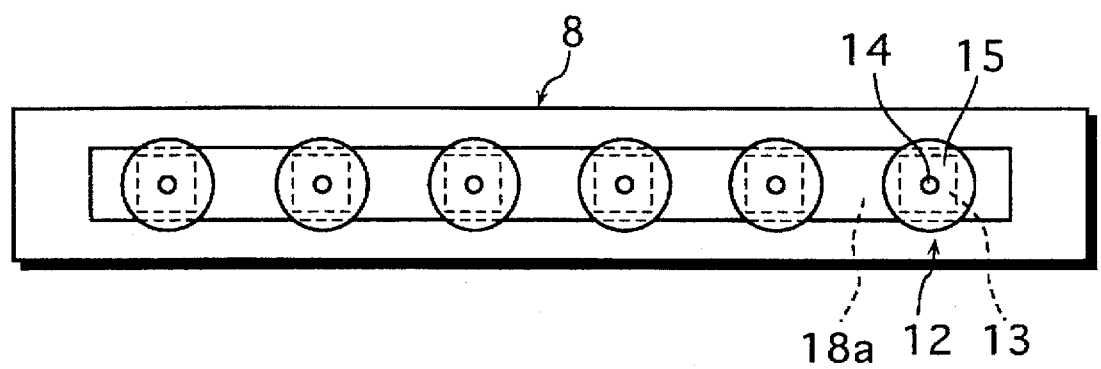
FIG. 6 is a section along lines VI—VI in FIG. 5.
Figure 7:
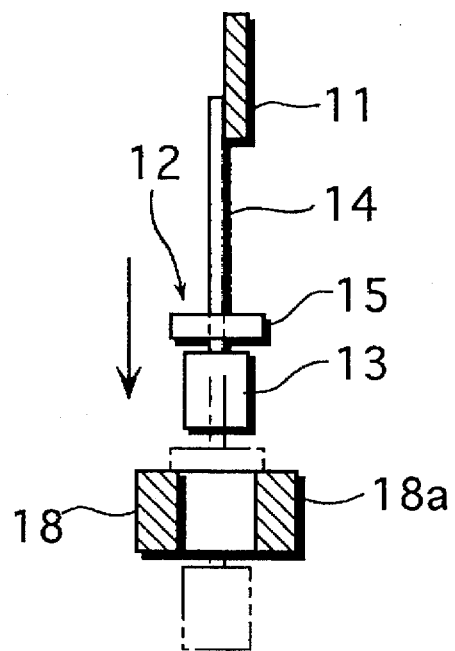
FIG. 7 is a section along lines VI—VI in FIG. 5.

After forming the solid electrolyte layer, the carrier bar 11 holding the thus treated capacitor pieces 12 is brought to a position immediately above an elongate shifting member 18 which has a slot 18a, and the carrier bar 11 is lowered toward the shifting member 18, as shown in FIGS. 5 through 7. The slot 18a has a width which allows passage of each capacitor chip 13 but prevents passage of the associated ring 15. Thus, when the carrier bar 11 holding the capacitor pieces 12 is forcibly lowered, the ring 15 comes into engagement with the shifting member 18 while the capacitor chip 13 continues to move downward through the slot 18a, as indicated by phantom lines in FIG. 7. As a result, the ring 15 is shifted away from the chip 13. Of course, the shifting member 18 may be lifted toward the carrier bar 11 instead of lowering the carrier bar 11 toward the shifting member 18.

Then, each capacitor chip 13 is graphitized and dipped in a metal paste (not shown) for forming a metal layer (not shown) which acts as a cathode electrode layer. At this time, since the associated ring 15 has been previously shifted away from the chip 13, the metal paste is prevented from moving upward along the ring 15.

Figure 8:
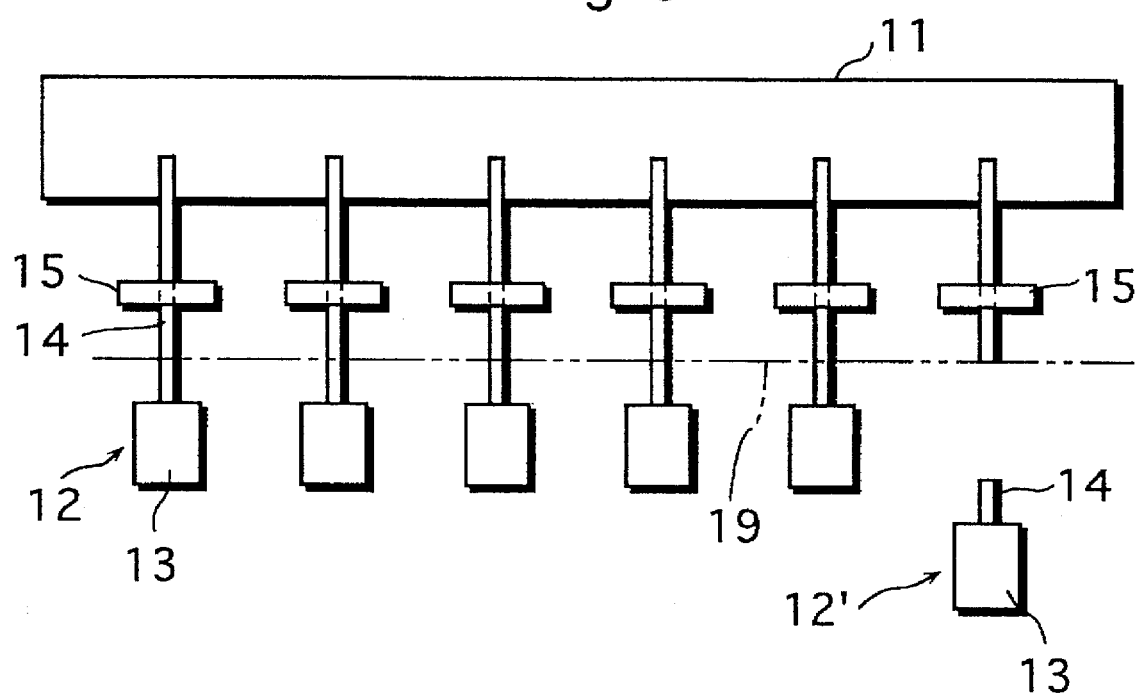
FIG. 8 is a front view showing a wire cutting step.

After forming the metallic cathode electrode layer, the anode wire 14 of each capacitor piece 12 is cut along a cutting line 19 under the corresponding ring 15 for removal or separation from the carrier bar 11 to provide an intended capacitor element 12', as shown in FIG. 8.

Figure 9:
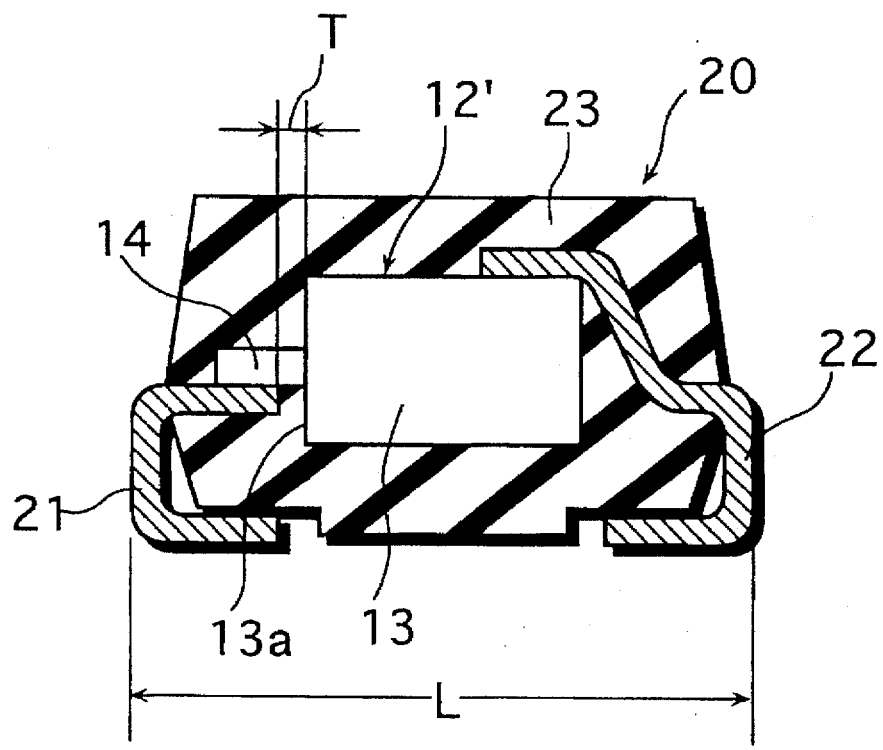
FIG. 9 is a sectional view showing a package solid electrolytic capacitor which incorporates a capacitor element made according to the process of the present invention.
Figure 10:
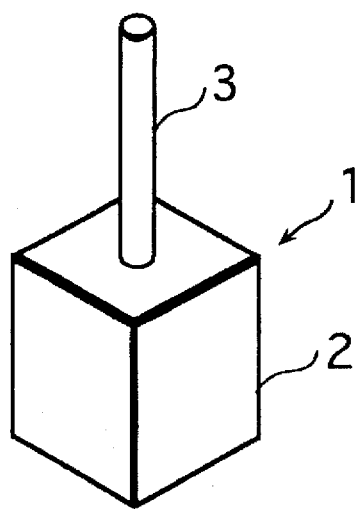
FIG. 10 is a perspective view showing a prior art capacitor element.
Figure 11:
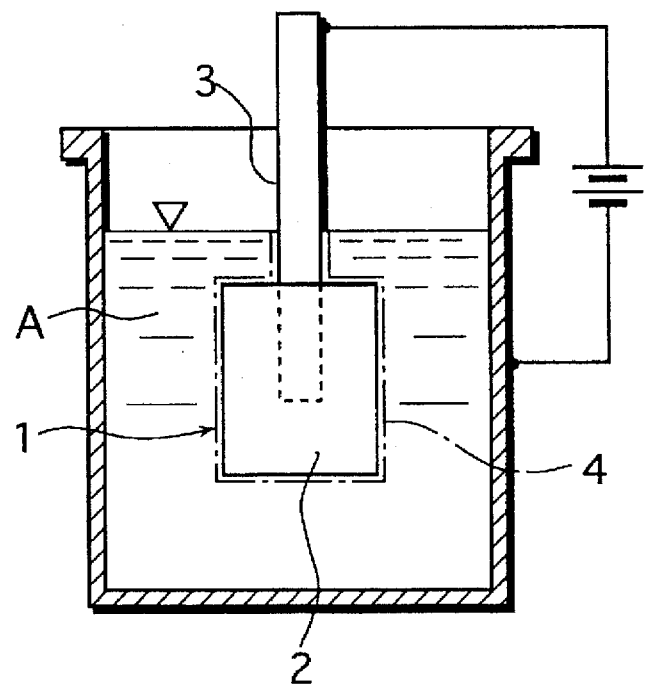
FIG. 11 is a front view, partially in vertical section, showing a prior art step of performing anodic oxidation.
Figure 12:
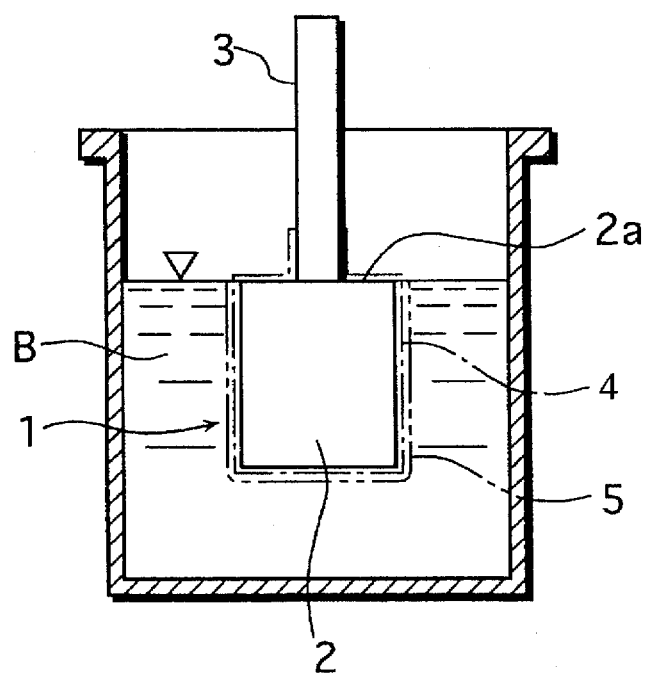
FIG. 12 is a front view, partially in vertical section, showing a prior art step of performing electrolyte formation.
Figure 13:
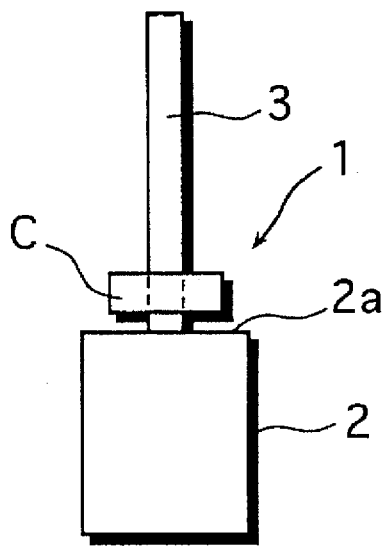
FIG. 13 is a front view showing another prior art capacitor element.

The capacitor element 12' thus obtained may be used to constitute a packaged solid electrolytic capacitor 20, as shown in FIG. 9. Specifically, the anode wire 14 is connected to an anode lead 21, whereas the chip 13 (more strictly the cathode electrode layer formed thereon) is connected to a cathode lead 22. The chip 13 may be indirectly connected to the cathode lead 22 via a safety fuse (not shown). The capacitor element 12' together with part of the anode and cathode leads 21, 22 is enclosed in a resin package 23.

Figure 14:
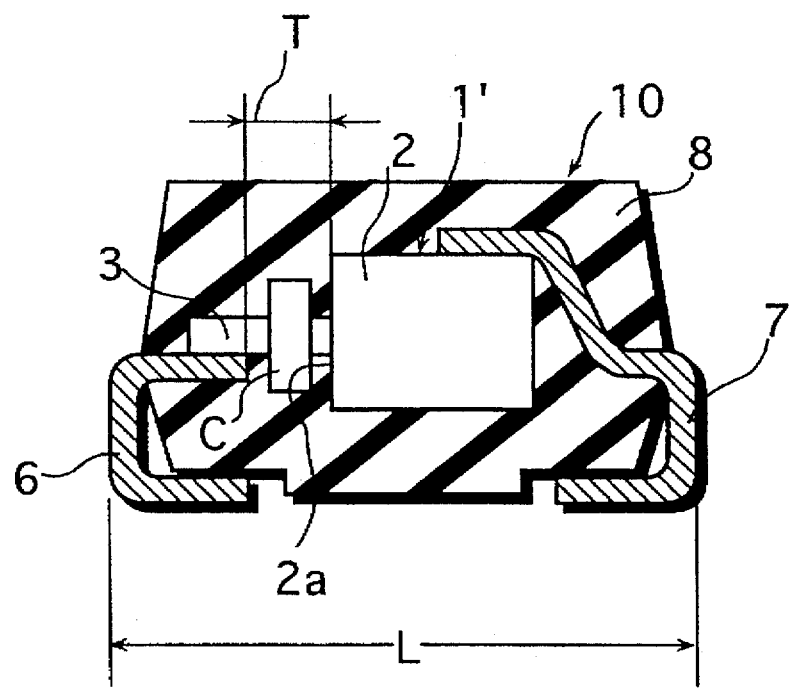
FIG. 14 is a sectional view showing a packaged solid electrolytic capacitor which incorporates the capacitor element shown in FIG. 13.

According to the arrangement of the solid electrolytic capacitor 20 shown in FIG. 9, the anode wire 14 is not fitted with the ring 15 which has been previously used in the process of making the capacitor element 12'. Therefore, the spacing T between the capacitor chip 13 and the inner end of the anode lead 21 can be greatly reduced in comparison with the prior art arrangement shown in FIG. 14. As a result, if the overall length L of the capacitor 20 is fixed, the volume of the capacitor chip 13 can be correspondingly increased to provide an increased capacitance. Conversely, if the capacitance of the capacitor 20 is fixed, the overall length L or size of the capacitor 20 can be correspondingly reduced.

It should be appreciated that the use of the slotted shifting member 18 (FIGS. 5 through 7) combined with the dimensional setting of the chips 13 and rings 15 greatly facilitates collective shifting of the rings 15 away from the chips 13. However, each ring 15 may be shifted manually or by using any suitable tool other than the slotted shifting member 18. Thus, the outer diameter of the ring 15 may be set smaller than a cross-sectional dimension of the corresponding chip 13.

Further, in an alternative process of making a capacitor element or elements, the shifting of the ring 15 away from the capacitor chip 13 may be performed after forming the metal cathode layer but before cutting the anode wire 14. In this case, a portion of the metal layer extending beyond the chip 13 need be removed before cutting the wire 14.

The preferred embodiment of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A process for making a capacitor element for a solid electrolytic capacitor comprising:

preparing at least one capacitor piece which includes a chip of a sintered mass of metal powder and an anode wire projecting from the chip;

forming a dieletric layer on the chip;

forming a solid electrolyte layer on the chip;

cutting the metal wire at a position spaced from the chip;

wherein a water-repellent member is fitted on the anode wire and located close to the chip at least up to finishing the step of forming the solid electrolyte layer;

wherein the water-repellent member is shifted along the anode wire away from the chip but retained on the anode wire at least before cutting the anode wire; and wherein the anode wire is cut at a position between the chip and the shifted water-repellent member.

2. The process according to claim 1, wherein the water-repellent member is shifted along the anode wire away from the chip after forming the solid electrolyte layer but before forming the metal layer.

3. The process according to claim 1, wherein the water-repellent member is shifted along the anode wire away from the chip after forming the metal layer but before cutting the anode wire.

4. The process according to claim 1, wherein the water-repellent member is a ring.

5. The process according to claim 4, wherein the ring has an outer diameter which is larger than a cross-sectional dimension of the chip.

6. The process according to claim 5, wherein the ring is shifted along the anode wire away from the chip by a shifting member having a slot which allows passage of the chip but prevents passage of the ring.

7. The process according to claim 1, wherein the anode wire is attached to a carrier bar up to finishing the step of forming the metal layer.

* * * * *